US009193438B2

(12) United States Patent
Lebernicheux et al.

(10) Patent No.: US 9,193,438 B2
(45) Date of Patent: Nov. 24, 2015

(54) COUPLING MECHANISM BETWEEN A MANUAL FLIGHT CONTROL MEMBER AND A TRIM ACTUATOR OF AN AIRCRAFT (71) Applicant: AIRBUS HELICOPTERS, Marignane (FR)

(72) Inventors: Brice Lebernicheux, Rennes (FR); Andre Le-Gall, Aix En Provence (FR)

(73) Assignee: Airbus Helicopters, Marignane (FR)

(*) Notice: Subject to any disclaimer, the term of this patent is extended or adjusted under 35 U.S.C. 154(b) by 0 days.

(21) Appl. No.: 14/330,068

(22) Filed: Jul. 14, 2014

(65) Prior Publication Data
US 2015/0014480 A1    Jan. 15, 2015

(30) Foreign Application Priority Data

Jul. 15, 2013  (FR) .................................. 13 01660

(51) Int. Cl.
| B64C 3/38 | (2006.01) |
| B64C 5/10 | (2006.01) |
| B64C 9/00 | (2006.01) |
| B64C 13/00 | (2006.01) |
| B64C 13/28 | (2006.01) |
| F16D 7/04 | (2006.01) |
| F16D 9/00 | (2006.01) |

(52) U.S. Cl.
CPC ............... *B64C 13/28* (2013.01); *F16D 7/044* (2013.01); *F16D 9/00* (2013.01)

(58) Field of Classification Search
CPC ......... B64C 12/24; B64C 12/34; F16D 7/042; F16D 7/044; F16D 7/046
USPC .............................. 244/178, 99.9, 99.2, 99.3
See application file for complete search history.

(56) References Cited

U.S. PATENT DOCUMENTS

| 4,030,578 A | 6/1977 | Cacciola et al. |
| 5,299,666 A | 4/1994 | Lang et al. |
| 7,520,813 B2 | 4/2009 | Louis et al. |

(Continued)

FOREIGN PATENT DOCUMENTS

| DE | 102012009149 | 11/2012 |
| EP | 1705115 | 9/2006 |
| FR | 2931131 | 11/2009 |

OTHER PUBLICATIONS

French Search Report for FR 1301660, Completed by the French Patent Office on Mar. 13, 2014, 7 Pages.

*Primary Examiner* — Christopher Ellis
*Assistant Examiner* — Richard G Davis
(74) *Attorney, Agent, or Firm* — Brooks Kushman P.C.

(57) ABSTRACT

A coupling mechanism between a control member (1') that generates manual flight commands and a trim actuator (4) forming part of a mechanical transmission train for transmitting flight commands in an aircraft. The coupling mechanism comprises axial engagement means between a lever arm (3) mechanically connected to the control member (1') and a pivot shaft (10) forming part of the trim actuator (4). The axial engagement means comprise co-operating interlocking members (13, 14) arranged on coupling members (18, 19) constrained to move in rotation respectively with the lever arm (3) and with the pivot shaft (10). Each of the coupling members (18, 19) includes axial passages (26) enabling the other coupling member (18, 19) to pass axially therethrough. An interruption of said axial engagement causes the coupling members (18, 19) to move axially one through the other under the effect of axial thrust (P) exerted by elastically deformable means (15) used for obtaining said axial engagement.

15 Claims, 3 Drawing Sheets

(56) References Cited

U.S. PATENT DOCUMENTS

| | | |
|---|---|---|
| 8,393,569 B2 | 3/2013 | Gemmati et al. |
| 2002/0030138 A1* | 3/2002 | Serven .................. 244/75 R |
| 2009/0283642 A1* | 11/2009 | Gemmati et al. ............. 244/178 |
| 2012/0025014 A1* | 2/2012 | Duyck et al. ................. 244/99.3 |

* cited by examiner fig.8

COUPLING MECHANISM BETWEEN A MANUAL FLIGHT CONTROL MEMBER AND A TRIM ACTUATOR OF AN AIRCRAFT

CROSS REFERENCE TO RELATED APPLICATION

This application claims priority to French patent application No. FR 13 01660 filed on Jul. 15, 2013, the disclosure of which is incorporated in its entirety by reference herein.

BACKGROUND OF THE INVENTION (1) Field of the Invention

The present invention relates to the field of systems for transmitting flight commands in aircraft, and in particular in rotorcraft, for causing a movable member to be moved in order to modify the attitude in flight of the aircraft. The present invention relates more specifically to drive trains for transmitting flight commands that involve both a trim actuator and a control member for generating manual flight commands.

More particularly, the present invention relates to ways of coupling a said trim actuator and a said control member.

(2) Description of Related Art

Aircraft are fitted with movable members that can be moved by a pilot in order to modify the attitude in flight of the aircraft. By way of example, such movable members are constituted by control surfaces or flaps in an airplane and possibly in a rotorcraft. In the specific situation of a rotorcraft, said movable members are mainly constituted by the blades of at least one rotor of the rotorcraft, said blades being mounted to be pivotable about a pitch axis in order to enable their pitch to be varied cyclically and/or collectively as a function of flight commands issued by a pilot.

Conventionally, said movable members are movable by means of drive trains connecting them to a control member for generating flight commands. Conventionally, such a drive train comprises a mechanical transmission train connecting at least one said movable member to a control member for generating manual flight commands that is movable in tilting by a human pilot.

When automatic flight commands are involved, said drive train also includes an autopilot that generates automatic flight commands for activating the operation of actuators placed in the mechanical transmission train.

For a given mechanical transmission train, the actuators typically comprise two actuators, commonly referred to as a "series" actuator and as a "trim" actuator. The series actuator is placed in series with the mechanical transmission train, being interposed between said control member and the movable member. The trim actuator is placed on the mechanical transmission train in parallel with the control member.

It is nevertheless necessary for the human pilot to know the position of the mechanical transmission train as moved by the trim actuator so that the pilot knows the current position of the movable member independently of it being moved by the control member or by the trim actuator. For this purpose, it is conventional to connect the control member and the trim actuator together mechanically.

The mechanical connection between the trim actuator and the control member is commonly provided via a lever arm fastened to the control member and coupled to a pivot shaft of the trim actuator. The pivot shaft is mounted to be stationary in translation and it is driven by a motor, in particular an electric motor. Operation of the motor depends on commands generated by the autopilot. The motor and the pivot shaft are typically mutually engaged via a step-down mechanism such that rotation of the motor causes the lever arm to pivot and consequently tilts the control member for moving the mechanical transmission train, thereby providing the pilot with knowledge of the current position of the movable member.

Under such conditions, the control member is tiltably mounted on the structure of the aircraft while being mechanically engaged with the mechanical transmission train and being secured to the lever arm that can be tilted by the pivot shaft of the trim actuator under the effect of commands generated by the autopilot.

It can thus be seen that a pivoting movement of the pivot shaft driven by the motor of the trim actuator causes the control member to move in tilting and also causes the movable member to be moved by means of the mechanical transmission train. Conversely, the human pilot imparting a tilting movement to the control member causes not only the movable member to move by means of the mechanical transmission train, but also causes the pivot shaft to pivot.

Furthermore, the trim actuator frequently incorporates one or more clutch mechanisms interposed between the motor and the pivot shaft. The trim actuator may also incorporate a force return mechanism between the motor and the pivot shaft, which mechanism involves elastically deformable members. Such a force return mechanism is commonly used to inform the human pilot via the control member about the position of the movable member relative to a predetermined neutral zone.

It can thus be seen that the trim actuator is a member that is structurally complex. In this context, account needs to be taken of the potential of a malfunction of the trim actuator leading to the pivot shaft becoming blocked at least in part or to it opposing resistance to being moved in pivoting, with the consequence of potentially giving rise to difficulties for the human pilot in moving the control member in tilting.

To solve this problem, it is conventional to place a breakable member, such as a shear pin, in the train for transmitting movement of the trim actuator and connecting together the pivot shaft and the motor.

In the event of a resisting force exceeding a predefined force threshold being opposed to transmitting movement between the trim actuator and the control member, the breakable member is voluntarily broken by the human pilot tilting the control member hard in order to release it from the influence being exerted by the trim actuator. As a result of such arrangements, in the event of the trim actuator malfunctioning, the human pilot can nevertheless move the mechanical transmission train freely in order to move the movable member by using the control member once it has been released of the influence exerted by the trim actuator.

That solution is effective, but uncomfortable for the human pilot. In order to avoid unwanted breakage of the breakable member, said force threshold is defined to be of considerable value. In the event of the human pilot having difficulty in moving the control member because of a malfunction of the trim actuator, the human pilot must then break the breakable member by applying a large tilting force on the control member.

It would be desirable for the influence exerted by the trim actuator on the control member to be released spontaneously in the event of a malfunction giving rise to said resisting force. It would also be desirable for said force threshold to be predefined as accurately as possible. In the event of the control member being released from the influence exerted thereon by the trim actuator, it is also appropriate to ensure that it is not possible for the trim actuator to regain influence spontaneously over the control member in the event of the resisting force dropping below the predefined force threshold.

In this context, document FR 2 931 131 (Eurocopter France) proposes incorporating a torque limiter mechanism in a trim actuator, the mechanism being interposed in the movement train that is incorporated in the trim actuator, interconnecting the pivot shaft and the motor. More particularly, the torque limiter mechanism is interposed between the pivot shaft and an intermediate shaft driven by the motor.

According to FR 2 931 131, the torque limiter mechanism provides rotary coupling between the pivot shaft and the intermediate shaft via a ball abutment. In the event of malfunction of the trim actuator giving rise to a resisting force between the pivot shaft and the intermediate shaft that exceeds a predefined force threshold, the pivot shaft is caused spontaneously to become uncoupled from the intermediate shaft in order to release the control member from the influence exerted by the trim actuator. Such spontaneous uncoupling is made to be irreversible by placing the balls in specific housings of the torque limiter mechanism during the uncoupling operation, with it not being possible for the balls to escape spontaneously from those housings. In order to reestablish coupling between the pivot shaft and the intermediate shaft, human intervention is needed in order to reset the torque limiter mechanism.

Reference may also be made to the following documents, which describe various torque limiter mechanisms between two rotary shafts: EP 1 705 115 (Eurocopter France); DE 10 2012 009149 (Liebherr Aerospace GmbH); U.S. Pat. No. 5,299,666 (D. J. Lang et al.); and U.S. Pat. No. 4,030,578 (M. J. Cacciola, et al.).

Nevertheless, it appears that the structure, the integration, and the modes of operation of such a torque limiter mechanism in the trim actuator could be improved.

It is desirable for the torque limiter mechanism to be integrated in the trim actuator while avoiding as much as possible adding complexity to the structure of the trim actuator. It is also desirable to avoid increasing the weight and the overall size of the trim actuator, and to limit the cost of producing it and of maintaining it.

Furthermore, the organization and the operation of the torque limiter mechanism should enable it to be reset easily so as to reestablish the influence of the trim actuator on the control member. It is essential for such resetting to be performed solely by human intervention, and to ensure that an operator finds it as easy as possible to do, in particular by limiting operations of dismantling the trim actuator. Furthermore, and as mentioned above, the trim actuator potentially includes numerous members that are associated with one another. A malfunction of the trim actuator may thus be caused by a malfunction of any one of these associated members and/or may result from a malfunction of means for causing these associated members to co-operate with one another.

In this context, it is desirable for the release of the control member from the influence exerted by the trim actuator to be provided by means that are located as close as possible to the engagement between the control member and the trim actuator. Nevertheless, it is not appropriate to make the mechanical connection between the trim actuator and the control member via said lever arm any more complex.

The present invention lies in the context of a mechanical transmission train for transmitting flight commands in a rotorcraft in order to move a movable member that modifies the attitude in flight of the aircraft. Such a mechanical transmission train comprises in particular a control member movable by a human pilot in order to generate manual flight commands and in particular also comprises a trim actuator having a pivot shaft driven by a motor and mechanically connected to the control member via a coupling mechanism including a lever arm coupled to the pivot shaft and mechanically connected to the control member. On the basis of the above observation from which the present invention stems, modes of coupling are proposed between the control member and the trim actuator that enable the control member to be released from the influence exerted by the trim actuator in the event of a malfunction. The present invention seeks in particular to provide a coupling mechanism between the control member and the trim actuator that provides as well as possible a satisfactory compromise taking account of all of the above-specified constraints.

BRIEF SUMMARY OF THE INVENTION

To this end, an object of the present invention is to provide a coupling mechanism that enables a torque limiter mechanism to be used for interrupting the influence exerted by the trim actuator on the control member against it being moved in tilting by a human pilot in the event of a malfunction of the trim actuator generating a resisting force against movement of the control member that exceeds a predefined force threshold.

More particularly, the present invention seeks to provide such a looked-for coupling mechanism firstly with a structure that is simple, reliable, and long-lasting, and secondly that makes it possible:

to obtain spontaneous release of the control member from the influence exerted thereon by the pivot shaft at said force threshold;

to obtain said spontaneous release in the event of resistance to the transmission of movement between the control member and the trim actuator, even if such resistance is potentially not very strong. In particular, it is desirable to allow said release to take place at a resisting force threshold that may be selected to have a low value, so as to ensure that said release occurs for any kind of malfunction of any of the members included in the trim actuator, and in particular in the event of significant but not excessive seizing of the trim actuator;

to require human intervention in order to reset the coupling mechanism, i.e. in order to put the trim actuator and the control member back into mutual engagement in the event of such engagement being interrupted under the effect of a said resisting force; and to make said human intervention of resetting the coupling mechanism easy by simplifying the operations that need to be performed, and in particular by avoiding as much as possible any dismantling of the trim actuator.

The mechanism of the present invention is a coupling mechanism between a control member for generating manual flight commands and a pivot shaft of a trim actuator in a drive train for transmitting flight commands in an aircraft.

The coupling mechanism uses the pivot shaft that is mounted to be stationary in translation and that is driven in pivoting about the axis along which it extends generally by a motor. By way of illustration, the pivot shaft is constituted by the outlet shaft of the trim actuator and may be constituted at least in part by a motor shaft of a drive train for transmitting movement of the trim actuator and interposed between the motor and the pivot shaft.

The coupling mechanism also uses the control member that is mounted tiltably, in particular on a support on board the aircraft, and that is mechanically connected to a lever arm coupled with the pivot shaft so that pivoting of the pivot shaft causes the lever arm to tilt and consequently causes the control member to tilt.

The coupling mechanism also uses a torque limiter mechanism comprising interlocking members that co-operate with one another by nesting under the effect of thrust exerted by elastically deformable means such that a force that resists transmission of movement between the control member and the pivot shaft of the trim actuator that is greater than a predefined force threshold spontaneously causes mutual co-operation between the interlocking members to be interrupted.

The force threshold is predefined in particular by the thrust force exerted by the elastically deformable means. Said spontaneous interruption of the mutual co-operation between the interlocking members causes the control member to be released from the influence exerted by the pivot shaft of the trim actuator on the lever arm that is mechanically connected to the control member.

In the present invention, such a coupling mechanism is mainly recognizable in that the coupling between the pivot shaft and the lever arm takes place via axial engagement means along said axis. The engagement is performed by said interlocking members that are arranged on respective ones of a pair of coupling members. A first one of the coupling members is constrained in rotation with the lever arm and a second coupling member is constrained in rotation with the pivot shaft.

Furthermore, each of the coupling members includes axial passages enabling the other coupling member to pass therethrough. Said interruption of the mutual co-operation between the interlocking members causes the coupling members to move axially one through the other via the passages under the effect of axial thrust exerted by said elastically deformable means against a movable one of the coupling members.

The coupling mechanism is organized in such a manner that a resisting force exceeding the force threshold causes the coupling members to pivot relative to each other about said axis, and consequently causes the coupling members to be offset radially relative to each other with the effect of separating the interlocking members by one sliding on the other against the axial thrust exerted by the elastically deformable means against the movable coupling member.

Said radial offset may be used to place the coupling members radially relative to each other in a radial interruption position in which radial interruption position the mutual co-operation between the interlocking members is interrupted. In said radial interruption position, the radial orientation of the passage of either one of the coupling members is suitable for allowing the other coupling member to pass therethrough when the movable coupling member is moved by the elastically deformable means towards a retracted position of the movable coupling member.

In the retracted position, the movable coupling member is preferably ejected out from the other coupling member while releasing the lever arm from the influence exerted by the pivot shaft, and consequently while releasing the control member from the influence exerted by the trim actuator on the control member.

It should be understood that the movable coupling member may advantageously be ejected out from the other coupling member via the end of said other coupling member that is axially remote from its face including its interlocking member. As a result, an interruption of the coupling between the pivot shaft and the lever arm places the movable coupling member in an empty zone of the torque limiter mechanism that is easily accessible for an operator in order to reset the coupling mechanism.

Such resetting it easily performed by the operator pushing the movable coupling member axially against the axial thrust exerted thereon by the elastically deformable means, and then by pivoting at least one of the pivot shaft and/or the lever arm, advantageously by using the control member, so as to place the interlocking members in the engaged position.

It should naturally be understood that the concepts "axial" and "radial" are relative concepts identified by said axis along which the pivot shaft extends and about which the pivot shaft can turn and about which the lever arm can tilt.

The coupling mechanism is simple in structure and the coupling between the pivot shaft and the lever arm by axial engagement is robust in spite of the possibility that is made available for interrupting said coupling in the event of the pivot shaft opposing resistance to being driven by the control member in the event of a malfunction of the trim actuator. The robustness of the axial engagement can easily be reinforced by arranging the interlocking members as members that are securely incorporated in the coupling members and by shaping them with a section of dihedral shape extending over a radial extent that may be considerable, thereby encouraging co-operation between the coupling members and encouraging said sliding that leads to the coupling between the pivot shaft and the lever arm being interrupted.

The torque limiter mechanism is arranged as axial engagement means between the lever arm and the pivot shaft, being placed as close as possible to the lever arm that constitutes an outlet member of the trim actuator for providing the mechanical connection between the trim actuator and the control member. Such arrangements are favorable to obtaining an interruption of the engagement between the control member and the trim actuator in the event of a malfunction of any of the members included in the train for transmitting movement between the motor and the pivot shaft.

It should also be considered that the number of members forming the torque limiter mechanism is small, potentially being limited to the elastically deformable means arranged axially around the pivot shaft and to the coupling members incorporating the interlocking members that co-operate mutually by axial engagement.

Such arrangements make it possible to reduce as much as possible the overall size and weight of the movement transmission train connecting the motor to the pivot shaft, and also serves to reduce the risk of any malfunction of the torque limiter mechanism.

Furthermore, the torque limiter mechanism is compact, enabling it to be installed by being interposed radially between the lever arm and the pivot shaft in a zone of axial extent that corresponds to the axial extent occupied by the lever arm.

In addition, arranging the torque limiter mechanism as axial engagement means between the pivot shaft and the lever arm makes it possible to take account of a force threshold that is accurately defined.

Furthermore, the coupling mechanism requires human intervention in order to be reset. Once the axial engagement has been interrupted, the movable coupling member is spontaneously kept in its refracted position by the elastically deformable means exerting axial thrust against the movable coupling member.

More particularly, said mutual co-operation between the interlocking members is interrupted by one of the coupling members being offset radially relative to the other under the effect of a said resisting force greater than the torque threshold. Said radial offset advantageously allows the movable coupling member to move axially through the other coupling member, referred to as the "stationary" coupling member, towards a refracted position outside the stationary coupling member into which the movable coupling member is advantageously ejected by the elastically deformable means.

In an advantageous embodiment, a removable cover provides a chamber for receiving the movable coupling member in the retracted position. Withdrawing the cover gives an operator access to the movable coupling member in the refracted position, thus making it easy for the operator to reset the connection device. Such a removable cover may easily be fastened to the lever arm.

The interlocking members and at least part of the passages are preferably formed on respective axially open shoulders formed respectively on each of the coupling members. Such shoulders are arranged in particular on the mutually facing axial end faces of the coupling members in the engaged position.

In an embodiment, each of the shoulders of the coupling members is formed with a set of radial fins. Such radial fins are suitable for leaving axial gaps between them for passing the fins of the other coupling member, thereby forming at least part of said passages.

By way of example, the first coupling member is arranged as a ring having a first shoulder with a first set of interlocking members and a first said passage. By way of example, the second coupling member is movable and is arranged as a bushing engaged around the pivot shaft and provided with a second shoulder having a second set of interlocking members and a second said passage.

The interlocking members are arranged respectively as ridges and as furrows of complementary shapes with dihedral-shaped sections suitable for providing ramps enabling the interlocking members to slide one against the other under the effect of said resisting force against the axial thrust exerted by the elastically deformable means against the movable coupling member.

In a preferred embodiment, the elastically deformable means comprise a set of dish-shaped spring washers that are stacked axially head to tail, together with a coil spring. The dish-shaped washers are robust and suitable for developing a considerable axial thrust force against the movable coupling member in order to keep the interlocking members in co-operation.

The coil spring gives the elastically deformable means sufficient development for pushing the movable coupling member into the retracted position, while supplying sufficient thrust to move the movable coupling member into the retracted position as it passes without obstacle through the other coupling member.

Advantageously, the lever arm includes a cylinder forming a cage housing at least a segment of the pivot shaft engaged with the second coupling member and housing the elastically deformable means and the coupling members, at least in the engaged position.

Preferably, the movable coupling member is guided in axial movement in translation by guide means of that one of the members constituted by the lever arm and the pivot shaft with which the movable coupling member is constrained to move in rotation.

It should naturally be understood that when the movable coupling member is the coupling member that is constrained to rotate with the lever arm, the movable coupling member is guided in axial movement by the lever arm. Conversely, when the movable coupling member is the coupling member constrained to rotate with the pivot shaft, the movable coupling member is guided in axial movement by the pivot shaft.

The means for guiding movement in translation are in particular of the keying type, or preferably and in analogous manner of the type using fluting. Such guide means also provide the rotary connection between the movable coupling member and said one of the members constituted by the lever arm and the pivot shaft with which the movable coupling member is constrained to move in rotation.

Appropriately, the stationary coupling member is secured by fastener means to that one of the members constituted by the lever arm and the pivot shaft with which the stationary coupling member is constrained to move in rotation. Such fastener means make use for example of sealing means or of co-operating fastener members such as by mutual engagement or by screw fastening.

In an embodiment, the movable coupling member is formed by the first coupling member and the stationary coupling member is formed by the second coupling member.

In another embodiment, the movable coupling member is preferably formed by the second coupling member and the stationary coupling member is formed by the first coupling member.

It can be seen that the movable coupling member passing into the retracted position can easily be identified by means for detecting the movable coupling member in the retracted position. Such detection means are suitable for indicating that engagement between the trim actuator and the control member has been interrupted. Such information concerning the interruption of engagement may advantageously be used by means for generating a warning signal.

The present invention also provides a trim actuator for an aircraft arranged to be fitted to a mechanical transmission train for transmitting flight commands causing movement of a movable member that modifies the attitude in flight of an aircraft. The trim actuator of the present invention advantageously comprises a pivot shaft driven in pivoting by a motor and coupled to a lever arm having mechanical connection means dedicated to mechanically connecting the trim actuator with a control member for generating manual flight commands and that forms part of said mechanical transmission train for transmitting flight commands.

The trim actuator of the present invention is mainly recognizable in that it incorporates axial engagement means between the lever arm and the pivot shaft in compliance with the axial engagement means included in the coupling mechanism as described above.

BRIEF DESCRIPTION OF THE SEVERAL VIEWS OF THE DRAWINGS

Preferred embodiments of the present invention are described with reference to the figures of the accompanying sheets, in which.

DETAILED DESCRIPTION OF THE INVENTION

Figure 1:
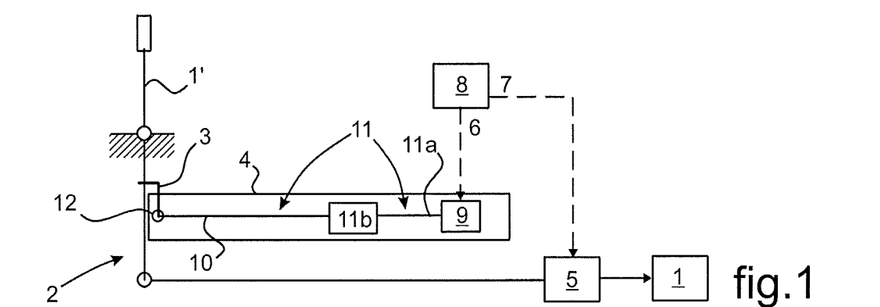
FIG. 1 is a diagrammatic representation of a drive train for moving a movable member of an aircraft for modifying the attitude in flight of the aircraft.

In FIG. 1, a drive train is dedicated to moving a movable member 1 of an aircraft for modifying its attitude in flight. The drive train comprises a mechanical transmission train 2 interposed between the movable member 1 and a control member 1' that is movable by a human pilot of the aircraft in order to control flight manually.

The drive train also has actuators 4, 5 placed in the mechanical transmission train 2 for moving it in compliance with commands 6, 7 issued by an autopilot 8. Such actuators 4, 5 comprise a trim actuator 4 placed in the mechanical transmission train 2 in parallel with the control member 1' and a "series" actuator 5 placed in the mechanical transmission train 2 so as to be interposed between the control member 1' and the movable member 1.

The trim actuator 4 has a motor 9 for driving rotation of a pivot shaft 10 via a movement transmission train 11. Starting from a drive shaft 11a engaged with a rotor of the motor 9, such a movement transmission train 11 commonly comprises various mechanical transmission members 11b incorporated in the trim actuator 4, such as step-down gearing, clutch mechanisms, and/or a force return mechanism, for example.

The pivot shaft 10 is held stationary in translation and is constrained to rotate with the control member 1' by a lever arm 3 in order to cause the mechanical transmission train 2 to move in compliance with commands 6 generated by the autopilot 8 and conversely in order to return forces to the control member 1' when it is moved by the human pilot. The control member 1' is driven in tilting by the pivot shaft 10 via the lever arm 3 when the trim actuator 4 is used to move the movable member 1. Such arrangements enable the human pilot to be informed about the state of the mechanical transmission train 2, regardless of the mode in which it is controlled, i.e. a manual control mode involving the human pilot moving the control member 1' or an automatic control mode using the trim actuator 4 operated under the control of the autopilot 8.

In this context, when the human pilot causes the control member 1' to tilt in order to move the mechanical transmission train 2, the pivot shaft 10 is caused to pivot. There thus arises a problem of malfunction of the trim actuator 4 that could make it difficult for the human pilot to move the control member 1', which would impede the pilot in modifying the flight attitude of the aircraft by tilting the control member 1'.

In order to avoid such a situation, it is known to make use of a torque limiter mechanism 12 serving to interrupt the influence exerted by the trim actuator on the control member 1' at a predetermined resisting force threshold that the trim actuator opposes against the movement of the control member 1' by the human pilot. It should be understood that such an influence is commonly considered as being exerted mechanically by the trim actuator 4 via the motor 9 or via any other member in the movement transmission train 11 that extends from the motor 9 to the control member 1'.

Such a torque limiter mechanism 12 is preferably incorporated in the trim actuator 4 in the movement transmission train 11 in order to avoid enlarging and/or making more complex the mechanical connection between the lever arm 3 and the control member 1'. Nevertheless, it should be understood that an analogous embodiment could be provided in which the torque limiter mechanism 12 is interposed between a pivot finger incorporated in the lever arm 3 secured to the pivot shaft 10 and a cylinder secured to the control member 1'.

Ideally, it is useful to place the torque limiter mechanism 12 as close as possible to the lever arm 3 in order to make it possible to accommodate a possible malfunction of any of the members included in the movement transmission train 11 of the trim actuator 4. It is also useful to incorporate such a torque limiter mechanism 12 so as to limit the overall size and the structural complexity of the trim actuator 4.

To this end, it is proposed that the torque limiter mechanism 12 should be interposed in the movement transmission train 11 of the trim actuator 4 between the lever arm 3 and the pivot shaft 10, with the torque limiter mechanism 12 being arranged as axial engagement means between the pivot shaft 10 and the lever arm 3.

Such a solution also makes it possible, while using a said torque limiter mechanism 12, to take account of a said resisting force threshold that is precise and to provide robust coupling between the control member 1' and the trim actuator 4.

In addition, the torque limiter mechanism 12 is placed in the movement transmission train 11 in an environment that is unobstructed, giving an operator easy access to the torque limiter mechanism 12, thereby making it easier to reset it, and in particular to do so without any need to dismantle the trim actuator 4.

In FIGS. 2 to 7, said torque limiter mechanism 12 is interposed between the pivot shaft 10 and the lever arm 3, being arranged as means for mutual axial engagement. The lever arm 3 has mechanical connection means 12' connecting it to the control member 1' in order to secure them to each other.

The lever arm 3 is also hinged to tilt about the axis A along which the pivot shaft 10 extends, with the lever arm 3 being coupled to the pivot shaft 10 by co-operating interlocking members 13, 14 respectively of the pivot shaft 10 and of the lever arm 3.

The interlocking members 13, 14 are caused to co-operate with each other under axial thrust P produced by elastically deformable means 15 arranged axially around the pivot shaft 10. When the force C resisting the transmission of movement between the lever arm 3 and the pivot shaft 10 becomes greater than an acceptable predefined force threshold, the co-operation between the interlocking members 13, 14 is interrupted against the axial thrust P exerted by the elastically deformable means 15.

The interlocking members 13, 14 are provided more particularly on shoulders 16, 17 of the coupling members 18, 19, and they are constrained to rotate respectively with the lever arm 3 and with the pivot shaft 10. The lever arm 3 has a cylinder 20 providing a cage housing the torque limiter mechanism 12. More particularly, the cylinder 20 houses a terminal segment of the pivot shaft 10, the elastically deformable means 15, and the coupling members 18, 19, at least while in the engaged position.

The elastically deformable means 15 bear axially against a movable one of the coupling members 18, 19.

The movable coupling member 18, 19 is mounted to move axially in translation along the axis A along which the pivot shaft 10 extends. The ability of the movable coupling member 18, 19 to move axially is used to provide engagement or conversely to interrupt engagement between the coupling members 18, 19.

Furthermore, in the event of engagement being interrupted, the ability of the movable coupling member 18, 19 to move axially is used to cause it to move axially into a retracted position under the effect of the thrust P that is advantageously exerted axially against the movable coupling member 18, 19 by the elastically deformable means 15.

Figure 2:
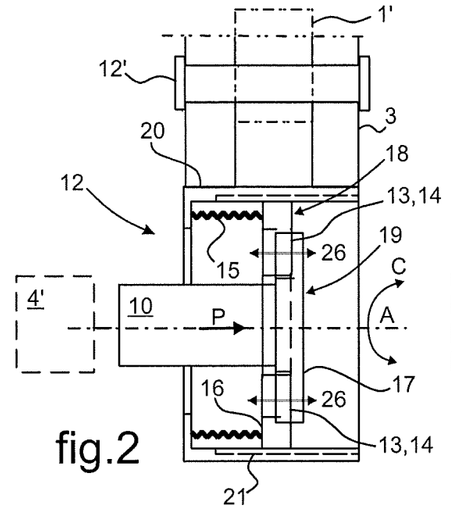
FIGS. 2 and 3 are diagrammatic axial section views of a coupling mechanism of the present invention in a first embodiment, shown respectively in an engaged position and in a position where such engagement is interrupted.
Figure 3:
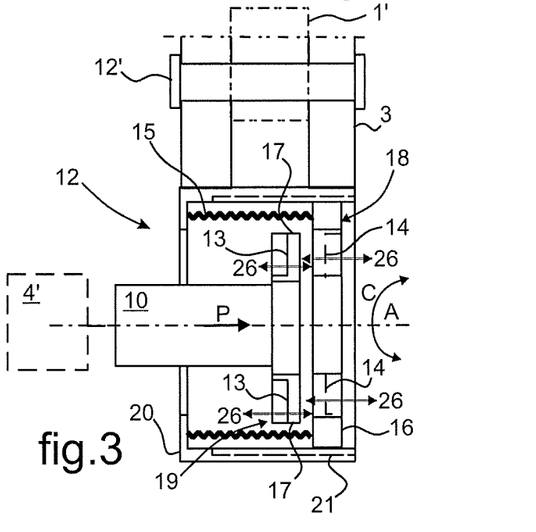

For example, in FIGS. 2 and 3, the elastically deformable means 15 bear axially against a first coupling member 18 constrained to rotate with the lever arm 3. Under such circumstances, it is this first coupling member 18 that forms said movable coupling member and it is guided to move axially in translation by the lever arm 3.

Also by way of example, in FIGS. 4 to 7, the elastically deformable means 15 bear axially against a second coupling member 19 that is constrained to rotate with the pivot shaft 10. Under such circumstances, it is this second coupling member 19 that forms said movable coupling member and that is guided to move in axial translation by the pivot shaft 10.

In a simple embodiment, guide means 21 guide the movable coupling member 18, 19 to move in axial translation. By way of example, such axial guide means 21 are advantageously means of the keying or fluting type, thereby also providing a rotary connection between the movable coupling member 18, 19 and the corresponding member, i.e. the lever arm 3 in the embodiment shown in FIGS. 2 and 3, or the pivot shaft 10 in the embodiments shown in FIGS. 4 to 7.

In FIGS. 2 and 3, the pivot shaft 10 is constrained to rotate with the second coupling member 19 by any conventional fastener means for securing them together, e.g. by being integrated by molding or machining, or indeed by making use of co-operating fastener members. Likewise, in FIGS. 4 to 7, the lever arm 3 is constrained to rotate with the first coupling member 18 by any conventional fastener means suitable for securing them together, in particular using co-operating fastener members as shown in FIG. 8, for example.

In FIGS. 2 to 7, each of the coupling members 18, 19 has axial passages 26 enabling the other coupling member 18, 19 to pass therethrough. Such axial passages 26 are more clearly visible in the perspective diagrams of FIG. 8 showing a simple embodiment of the axial passages 26.

In the event of the mutual co-operation between the interlocking members 13, 14 being interrupted, these provisions allow the coupling members 18, 19 to pass one through the other, thereby causing the movable coupling member 18, 19 to be ejected from the other coupling member 18, 19 that is not movably mounted, and that is referred to as the "stationary" coupling member. Such ejection causes the movable coupling member 18, 19 to be placed in a retracted position in an empty zone of the torque limiter mechanism 12 that is easily accessible by an operator.

Figure 4:
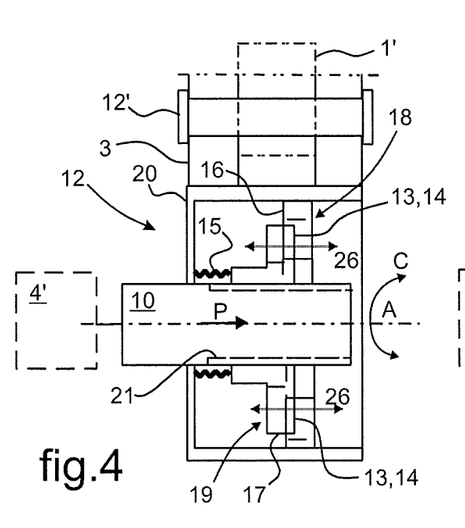
FIGS. 4 and 5 are diagrammatic axial section views of a coupling mechanism of the present invention in a second embodiment, shown respectively in an engaged position and in a position where such engagement is interrupted.
Figure 6:
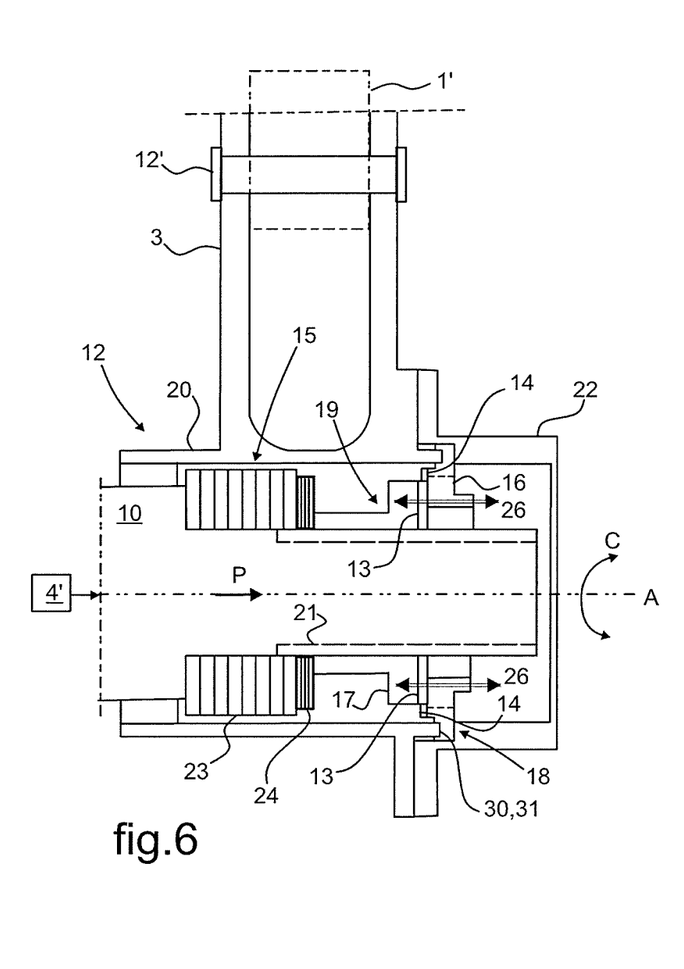
FIGS. 6 and 7 are axial section views of a coupling mechanism of the present invention in the embodiment shown diagrammatically in FIGS. 3 and 4, respectively in an engaged position and in a position where such engagement is interrupted.

More particularly, in FIGS. 2, 4, and 6, the coupling members 18, 19 are shown in the engaged position. In the engaged position, the lever arm 3 and the pivot shaft 10 are constrained together in rotation by means of the coupling members 18, 19 placed to bear axially against each other via their respective shoulders 16, 17.

In the engaged position, the interlocking members 13, 14 are kept in co-operation by the elastically deformable means 15 applying thrust against the movable coupling member 18, 19.

Figure 5:
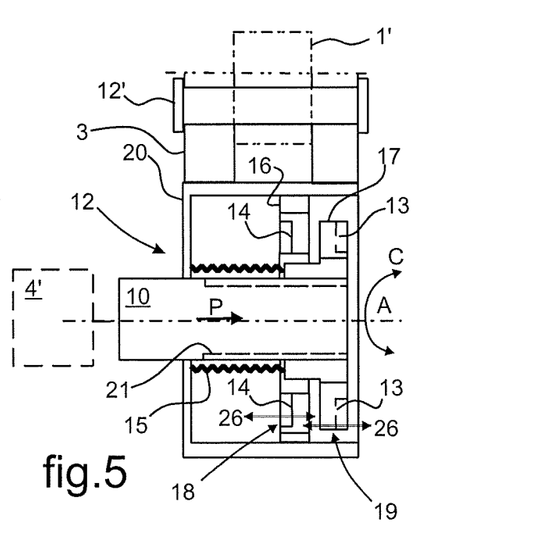
Figure 7:
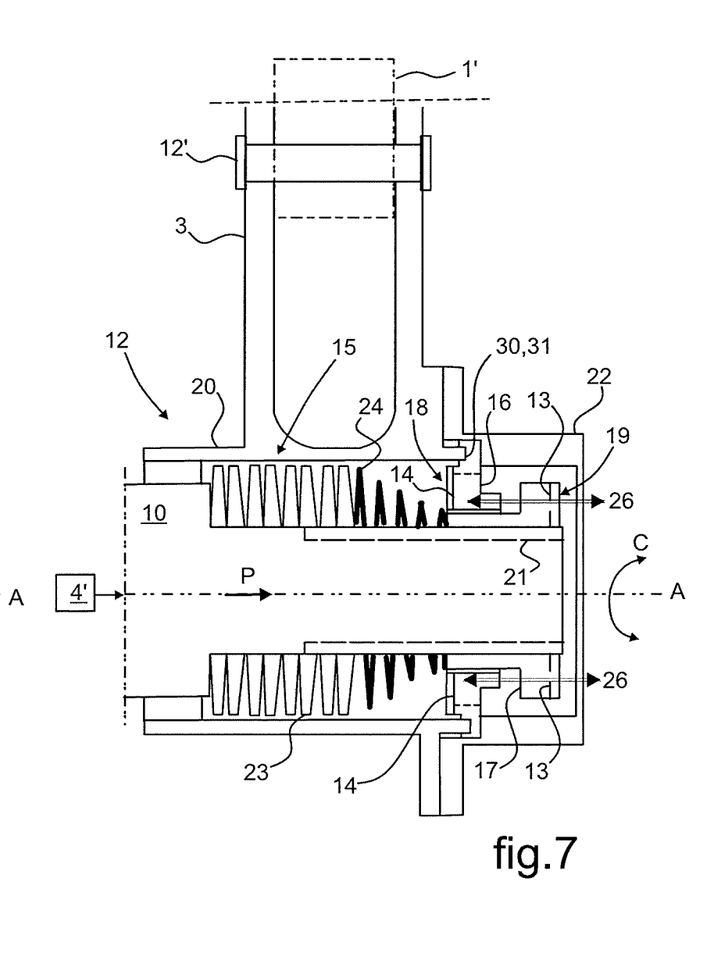
Figure 8:
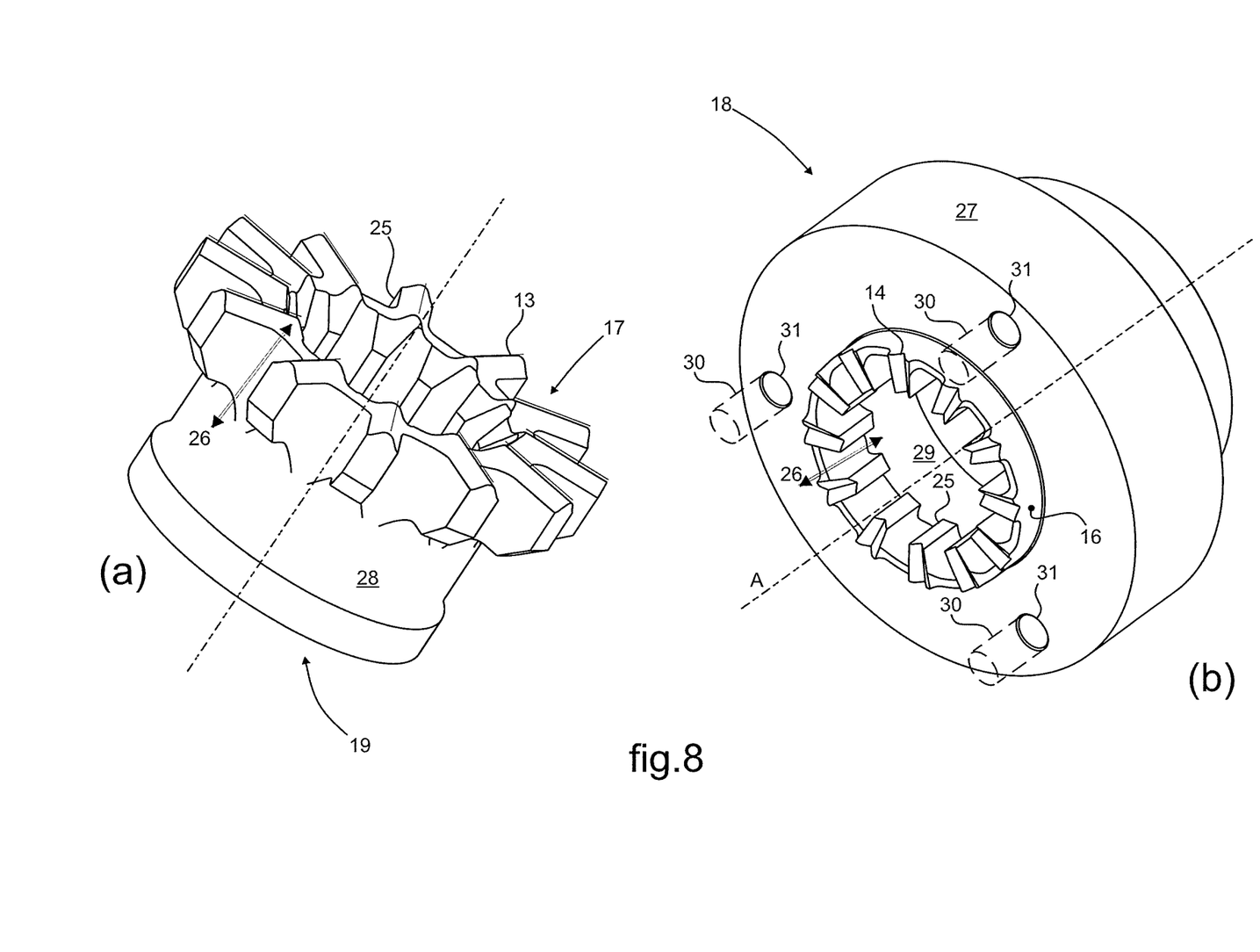
FIG. 8 comprises two perspective views (a) and (b) showing respective coupling members of the coupling mechanism shown in FIGS. 4 to 7.

In FIGS. 3, 5 and 7, the coupling members 18, 19 are in the position in which engagement has been interrupted. The movable coupling member 18, 19 has been discharged to an empty zone of the torque limiter mechanism 12, which empty zone is located at the free end of the pivot shaft 10 remote from its end engaged with any transmission member forming part of the movement transmission train of the trim actuator 4, e.g. an intermediate shaft 4'.

More particularly, in the engaged position, a resisting force C that is greater than the predefined force threshold causes relative pivoting between the coupling members 18, 19 about the axis A along which the pivot shaft 10 extends. Said relative pivoting causes co-operation between the two interlocking members 13, 14 to be interrupted against the axial thrust P exerted by the elastically deformable means 15 against the movable coupling member 18, 19. Furthermore, said relative pivoting allows the movable coupling member 18, 19 to pass through the stationary coupling member 18, 19 by means of the passages 26. The elastically deformable means 15 exert thrust P against the movable coupling member 18, 19 causing it to move axially and pass through the stationary coupling member 18, 19 towards the retracted position.

In FIGS. 6 and 7, the connection device has a removable protective cover 22 providing a chamber for receiving the movable coupling member 19 in the retracted position. An operator withdrawing the cover 22 obtains easy access to the movable coupling member 19 so as to enable the operator to reset the connection device.

For such resetting purposes, the operator pushes the movable coupling member 19 axially against the opposing thrust P exerted by the elastically deformable means 15 in order to move it in translation back through the stationary coupling member 18.

Thereafter, the operator applies a pivoting movement to the pivot shaft 10 and/or a tilting movement to the lever arm 3 via the control member 1' in order to place the coupling members 18, 19 in the engaged position by causing the interlocking members 13, 14 to co-operate mutually.

In the embodiment shown, the elastically deformable members 15 are formed by a stack of dish-shaped spring washers 23 arranged head to tail together with a coil spring 24 interposed between the stack of washers 23 and the movable coupling member 19.

In FIG. 8, a first coupling member 18 that is constrained to rotate with the lever arm is shown in view (b) and a second coupling member 19 that is constrained to rotate with the pivot shaft is shown in view (a).

Each coupling member 18, 19 has an axial shoulder 16, 17 formed by fins 25 that are radially distributed on the coupling members 18, 19. The fins 25 of one coupling member 18, 19 leave between them gaps for allowing the fins 25 of the other coupling member 18, 19 to pass therethrough. Such gaps constitute at least part of the passages 26 for allowing one coupling member 18, 19 to pass through the other coupling member 18, 19.

The fins 25 of one of the coupling members 18, 19 are ridge-shaped and they co-operate with respective interlocking members 14 incorporated in the other coupling member 18, 19 and that are furrow-shaped. In the embodiments shown, the furrows 14 are incorporated in the fins 25 of the first coupling member 18 and the ridges 13 are formed on the fins 25 of the second coupling member 19.

The ridges 13 and the furrows 14 may be arranged in analogous manner on either one of the first and second coupling members 18 and 19, or indeed they could be arranged in combination, e.g. in alternation, on both of the coupling members 18 and 19.

Such an arrangement of interlocking members 13, 14 gives them a dihedral section with bearing ramps enabling the interlocking members 13, 14 to slide one against the other. Such ramps may extend radially to facilitate co-operation of the coupling members 18, 19 while also making it possible, under the effect of a said resisting force, to move the coupling members 18, 19 axially apart from each other against the thrust exerted by the elastically deformable means 15 on the movable coupling member 18, 19.

Said resisting force threshold may be defined accurately by rating the resilient force of the elastically deformable means 15. The advantageous shape of the interlocking members 13, 14 as ridges and furrows nevertheless does not exclude any other shape providing a dihedral arrangement for the section of the interlocking members 13, 14 and providing said ramps enabling the interlocking members 13, 14 to slide one against the other.

The first coupling member 18 is arranged as a ring 27 allowing the second coupling member 19 in the form of a bushing 28 to pass therethrough. It should naturally be understood that concerning the first coupling member 18 in this configuration its passage 26 also includes the central hole 29 in the ring 27.

FIG. 8 also shows an embodiment of said fastener means 30, 31 of the stationary coupling member 18, 19. In this embodiment, the stationary coupling member is constituted by the first coupling member 18. Said fastener means 30, 31 are of the type whereby fingers 30 secured to the lever arm are received in complementary axial housings 31 that are circumferentially distributed around the first coupling member 18.

What is claimed is:

1. A coupling mechanism between a control member generating manual flight commands and a pivot shaft of a trim actuator of a flight command transmission drive train of an aircraft, the coupling mechanism comprising:

said pivot shaft mounted stationary in translation and driven in pivoting about an axis along which it generally extends by a motor;

a tiltably mounted control member mechanically connected to a lever arm coupled to the pivot shaft; and a torque limiter mechanism having interlocking members that co-operate with one another by nesting under the effect of thrust exerted by elastically deformable means;

whereby a force resisting transmission of movement between the pivot shaft and the control member greater than a force threshold that is predefined by a thrust force exerted by the elastically deformable means, spontaneously leads to mutual co-operation between the interlocking members being interrupted and to the control member being released from an influence exerted by the pivot shaft on the lever arm, wherein:

the coupling between the pivot shaft and the lever arm takes place via axial engagement means along said axis via said interlocking members arranged on respective ones of a pair of coupling members, a first coupling member being constrained in rotation with the lever arm and a second coupling member being constrained in rotation with the pivot shaft; and wherein each of the coupling members includes axial passages enabling the other coupling member to pass therethrough, said interruption of mutual co-operation between the interlocking members causing the coupling members to move axially one through the other via the passages in response to axial thrust exerted by said elastically deformable means against a movable one of the coupling members.

2. A coupling mechanism according to claim 1, wherein said mutual co-operation between the interlocking members is interrupted by one of the coupling members being offset radially relative to the other under the effect of a said resisting force greater than the torque threshold, and said radial offset allows the movable coupling member to move axially through the other coupling member, referred to as the "stationary" coupling member, towards a retracted position outside the stationary coupling member into which the movable coupling member is ejected by the elastically deformable means.

3. A coupling mechanism according to claim 2, wherein a removable cover provides a chamber for receiving the movable coupling member in the retracted position, with withdrawal of the cover giving an operator access to the movable coupling member in the retracted position.

4. A coupling mechanism according to claim 1, wherein the interlocking members and at least part of the passages are formed on respective axially open shoulders formed respectively on each of the coupling members.

5. A coupling mechanism according to claim 4, wherein each of the shoulders of the coupling members is formed with a set of radial fins leaving axial gaps between them for passing the fins of the other coupling member, thereby forming at least part of said passages.

6. A coupling mechanism according to claim 4, wherein the first coupling member is arranged as a ring having a first shoulder with a first set of interlocking members and a first said passage, and wherein the second coupling member is movable and is arranged as a bushing engaged around the pivot shaft and provided with a second shoulder having a second set of interlocking members and a second said passage.

7. A coupling mechanism according to claim 1, wherein the interlocking members are arranged respectively as ridges and as furrows of complementary shapes with dihedral-shaped sections providing ramps enabling the interlocking members to slide one against the other under the effect of said resisting force against the axial thrust exerted by the elastically deformable means against the movable coupling member.

8. A coupling mechanism according to claim 1, wherein the elastically deformable means comprise a set of dish-shaped spring washers that are stacked axially head to tail, together with a coil spring.

9. A coupling mechanism according to claim 1, wherein the lever arm includes a cylinder forming a cage housing at least a segment of the pivot shaft being engaged with the second coupling member and housing the elastically deformable means and the coupling members, at least in an engaged position.

10. A coupling mechanism according to claim 1, wherein the movable coupling member is guided in axial movement in translation by guide means of that one of the members constituted by the lever arm and the pivot shaft with which the movable coupling member is constrained to move in rotation.

11. A coupling mechanism according to claim 10, wherein the guide means are a keying type providing a rotary connection between the movable coupling member and said one of the members constituted by the lever arm and the pivot shaft with which the movable coupling member is constrained to move in rotation.

12. A coupling mechanism according to claim 1, wherein the stationary coupling member is secured by fastener means to that one of the members constituted by the lever arm and the pivot shaft with which the stationary coupling member is constrained to move in rotation.

13. A coupling mechanism according to claim 1, wherein a movable one of the coupling members is formed by the first coupling member and wherein the stationary coupling member is formed by the second coupling member.

14. A coupling mechanism according to claim 1, wherein a movable one of the one of the coupling members is formed by the second coupling member and wherein the stationary coupling member is formed by the first coupling member.

15. A trim actuator for an aircraft arranged to be fitted to a mechanical transmission train for transmitting flight commands causing movement of a movable member that modifies an attitude in flight of an aircraft, the trim actuator comprising a pivot shaft driven in pivoting by a motor and coupled to a lever arm having mechanical connection means dedicated to mechanically connecting the trim actuator with a control member for generating manual flight commands and that forms part of said mechanical transmission train for transmitting flight commands, wherein the trim actuator incorporates axial engagement means between the lever arm and the pivot shaft in compliance with the axial engagement means included in the coupling mechanism according to claim 1.

* * * * *